United States Patent [19]
Villanueva

[11] Patent Number: 5,746,950
[45] Date of Patent: May 5, 1998

[54] DRAIN HOSE ASSEMBLY

[76] Inventor: Robert Villanueva, 4711 Cumberland Cir., El Paso, Tex. 79903-1923

[21] Appl. No.: 768,627

[22] Filed: Dec. 18, 1996

[51] Int. Cl.$^6$ ............................................. B01F 3/04
[52] U.S. Cl. ................................. 261/29; 261/72.1
[58] Field of Search ............................... 261/29, 72.1

[56] References Cited

U.S. PATENT DOCUMENTS

| | | |
|---|---|---|
| 2,856,166 | 10/1958 | Goettl ............................. 261/29 |
| 4,562,016 | 12/1985 | Colliver ........................... 261/29 |
| 4,687,604 | 8/1987 | Goettl ............................ 261/72.1 |
| 5,192,464 | 3/1993 | Pawlowski et al. ............... 261/29 |

*Primary Examiner*—Tim R. Miles
*Attorney, Agent, or Firm*—John J. Byrne

[57] ABSTRACT

A drain assembly hose collection adapted to receive bleeder lines and/or overflow lines from a roof-supported evaporative cooler or the like in a manner which will help divert water flow away from the roof, thereby reducing serious staining and/or roof damage and at the same time providing a flexibility accommodating various plumbing and environmental ordinances.

4 Claims, 2 Drawing Sheets

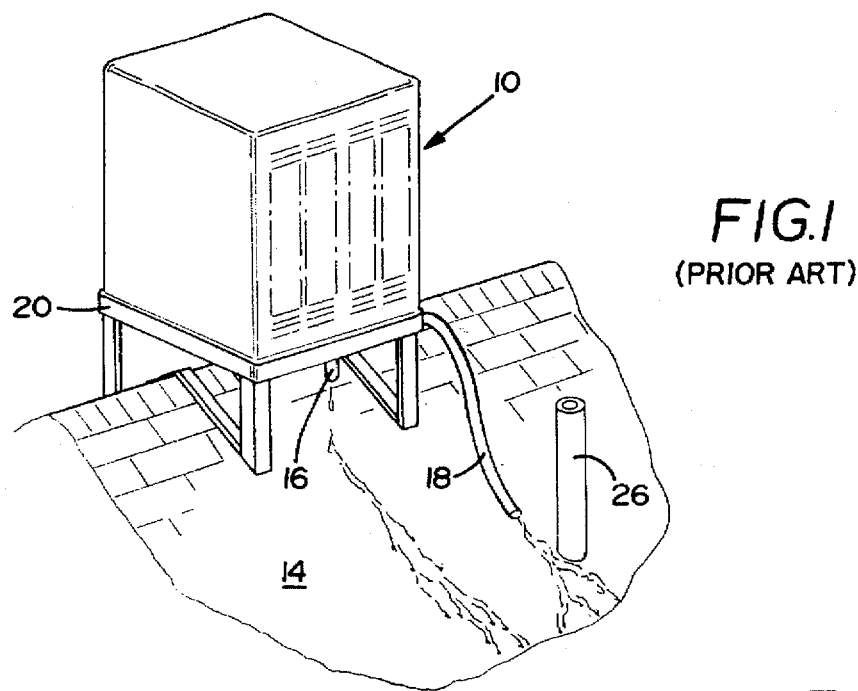
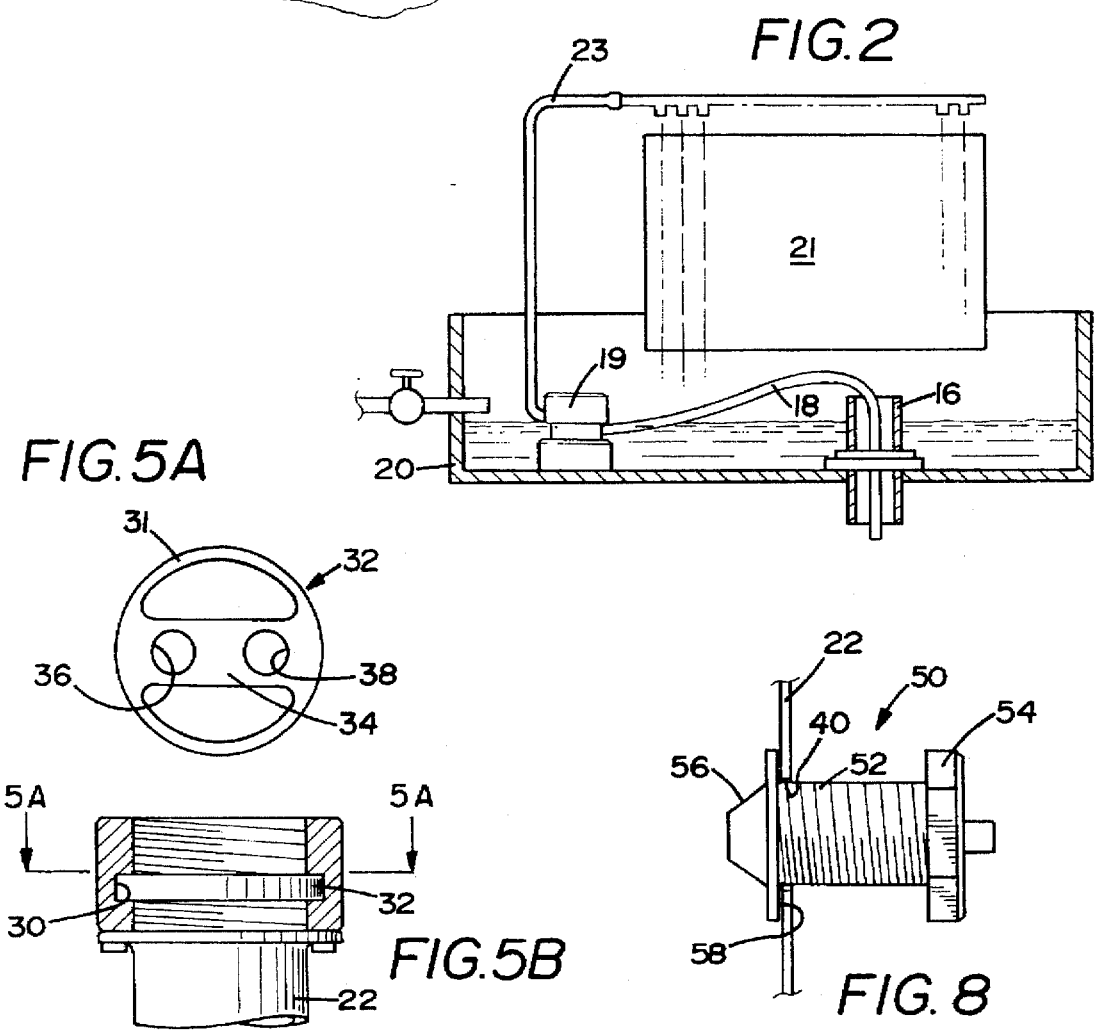

DRAIN HOSE ASSEMBLY

BACKGROUND OF THE INVENTION

In many parts of the world, for instance in the southwestern part of the United States, roof-mounted evaporative coolers are utilized for air conditioning purposes. Coolers of this type have a water reservoir pan located between the cooling apparatus and the roof on which it is supported. Water in the reservoir pan is pumped over wet pads as part of the cooling process. These drip pans include an overflow drain pipe to discharge water when too much collects therein or when water needs to be emptied and/or drained from the pan on a seasonal schedule. Evaporative coolers have pads of porous material which are dampened during operation. Fans blow air through the wet pads and temperatures fall during the evaporative process.

Many currently used units are provided with a bleeder line also known as a bleed-off tubing. A water pump is used to pump water from the pan to the wet pads so that the pads are maintained in a constant state of dampness. The bleeder line is connected to the water pump and continuously removes water from the pan to prevent the water from becoming stagnant. Although water from the bleeder line and/or from the overflow system is led away from these prior art coolers, it is not accomplished in the most beneficial fashion.

There is normally a float valve or the like in the reservoir pan which regulates the amount of water in the reservoir pan. If the water level exceeds the desired amount, the water source is closed. An overflow drain pipe is provided. Normally it is utilized approximately once a year, usually in the fall, to drain the unit completely.

Many cooling units provide a continuous supply of water to the reservoir so that water standing within the pan will not become stagnant. This water is constantly added to replace the water delivered to the wet pads. When the unit is inactive, a fraction of the water is pumped out of the pan through a bleeder line so that the water in the pan remains fresh.

Field of the Invention

The present invention is an apparatus for controlling the overflow and/or the bleed-off water from an evaporative cooler in a manner which prevents discoloration of and damage to the roof and leads the water to its most beneficial location while complying with most, if not all, local plumbing ordinances.

SUMMARY OF THE INVENTION

If the float valve fails, water will exit through the overflow drain pipe. If there is a flood of water, it will drip over the sides. In either event, the water will damage the roof over a long period of time. The pump is normally not working when the unit is off; that is, when the fan is not working. When coolers are not working for extended periods of time, the water in the pan can become stagnant.

To prevent this, the pumps on many units run intermittently or continuously to provide fresh water to the reservoir pan. Such coolers are equipped with bleeder lines to remove this water from the system. In numerous arid or water-short areas, local ordinances will not permit the use of bleeder lines if the water is wastefully routed to a sewer system. When bleeder lines are permitted, many ordinances prohibit wasting the water. The excess water must be led to a flower bed, lawn, or the like. The invention herein described provides an exit route for the bleeder line through the overflow assembly but provides an aperture means by which the bleeder line can exit the overflow assembly and be directed toward a beneficial area.

The invention also provides a means to receive an overflow line which can also exit through the overflow assembly and provides a second aperture by which it, too, can be routed to a beneficial use.

An important objective of this invention is to provide a drain hose assembly which will accept both bleeder and overflow lines in a fashion so as to direct the water therein to a sewer vent pipe or to such other location desired by the installer.

Another important objective of the invention is to provide an inexpensive collector drain hose assembly which will receive the bleeder and overflow lines in such a manner that the line outputs are readily diverted or combined and led to separate locations, if desired.

A still further objective of this invention is to provide a drain hose assembly with a washer support for holding the lines within the assembly and to provide this assembly with apertures therethrough from which one or both of the lines can exit.

Another important objective of this invention is to provide sealing plugs to close the aforementioned apertures when not in use.

It is also an objective of this invention to provide a clip or the like at the output end of the collector assembly so that it can be secured to a roof sewer vent pipe or the like.

These and other objectives will become more clearly understood upon a reading of the following description taken together with the drawings.

BRIEF DESCRIPTION OF THE DRAWINGS

FIG. 1 is a diagrammatic perspective view of a prior art evaporative cooler showing how water exiting therefrom can stain and/or damage the roof on which it is supported;

FIG. 2 is a partial cross-sectional view of a portion of the prior art drain system showing certain improvements thereof;

FIG. 5A is a plan view of a grommet washer;

FIG. 5B is a cross section disclosing how the washer is snapped into the end of the drain hose assembly;

FIG. 7 is a view similar to FIG. 6 with one line leading to the roof gutter and the other to a sewer vent or the like; and FIG. 8 is a view of a side elevation of a plug.

DESCRIPTION OF THE PREFERRED EMBODIMENT

Figure 3:
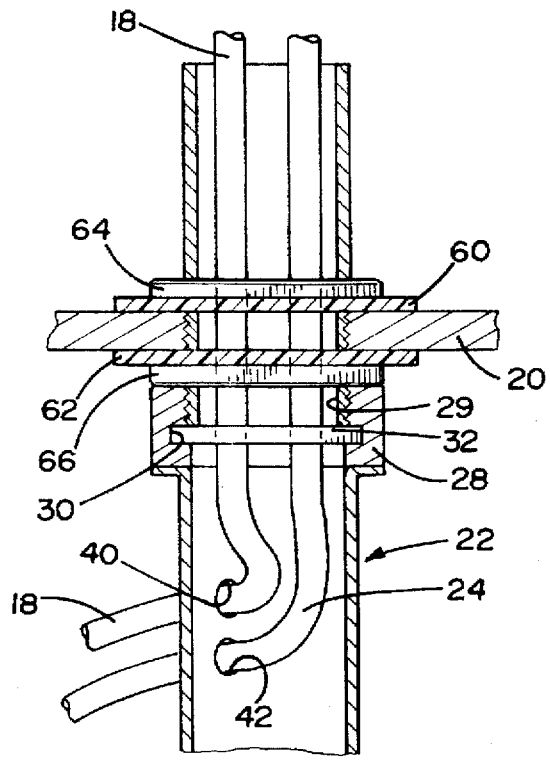
FIG. 3 is a diagrammatic cross-sectional view showing the overflow and bleeder lines secured by the collector assembly of this invention and then exiting through side orifices or apertures.

Referring now to the drawings wherein like numerals indicate like parts, the numeral 10 indicates a typical prior art roof-supported evaporative cooler of the type with which this invention is used. An evaporative cooler of this type is commonly mounted on a roof 14. Such units have an overflow drain pipe 16 or the like for removing excess water from the system.

FIG. 2 is a diagrammatic elevation showing many of the principal elements of a cooler. Many coolers are equipped with a bleeder line 18. All coolers have a water pump 19 for continuously or periodically removing water from water reservoir pan 20 and delivering that water to wet pads 21 via a line 23. The water drips through the wet pads. Water exiting from either the bleeder line and/or the overflow pipe 16 onto the roof is shown by the heavy lines of FIG. 1. Over time, this water will cause discoloration and unsightly stains and/or damage to a roof. In order to overcome these problems, the assembly of this invention is provided.

Figure 6:
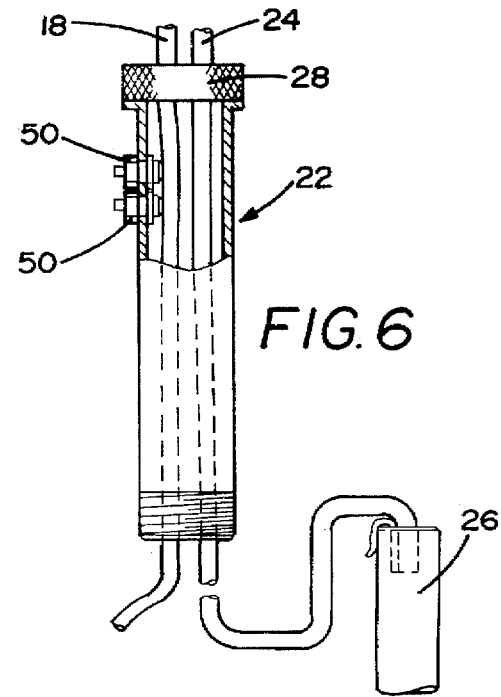
FIG. 6 is a diagrammatic elevational view partially in section showing the lines exiting through the drain hose assembly.

This principal component of this invention is a drain hose assembly 22. This component is adapted to receive the bleeder line 18. The assembly is threadedly coupled to overflow drain pipe 16, as seen in FIG. 3. The assembly is also adapted to receive an overflow line 24. As seen in FIG. 6, drain hose assembly 22 is conveniently clipped or secured to sewer vent 26. Sewer vents are commonly found extending upwardly from the roof of a building.

The drain hose assembly 22 is normally a flat hose equipped with a thickened or reinforcing collar 28 at a first end thereof. The interior of collar 28 is threaded at 29, which enables it to be threaded to the bottom of the overflow drain pipe 16. An interior groove 30 receives grommet-like washer 32. Washer 32 is relatively rigid but is deformable such that it can be snapped into, and retained by, groove 30.

Washer 32 has a periphery 31 having the same circumference as the interior peripheral base of groove 30. Washer 32 is equipped with a web member 34 extending across a diameter thereof. Web 34 is formed with openings 36 and 38. Opening 36 is dimensioned to receive bleeder line 18, and opening 38 is dimensioned to receive an overflow line 24.

Figure 4:
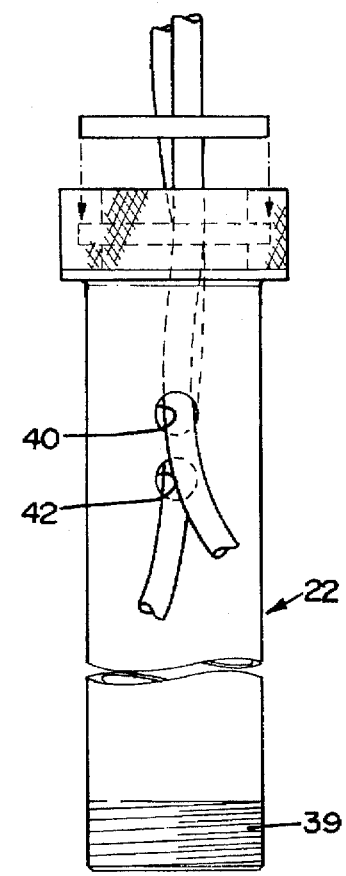
FIG. 4 is a diagrammatic side elevational view showing bleeder and overflow lines exiting the drain hose assembly of this invention.
Figure 7:
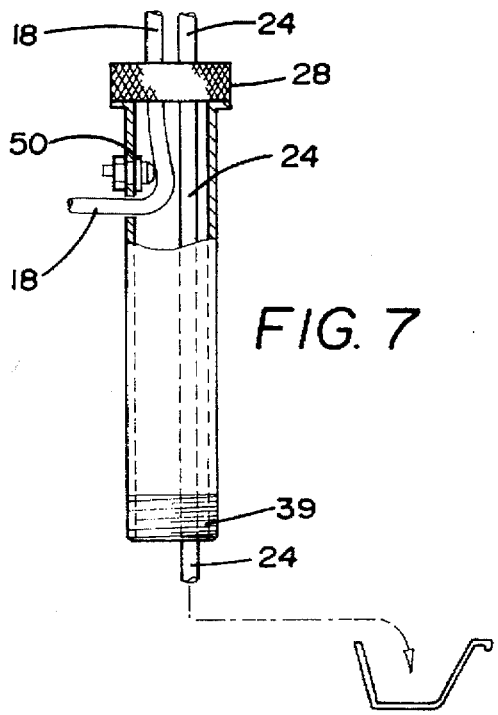

The bleeder line 18 should be long enough to reach the gutter of the roof or sufficiently long to reach a location desired by the installer. Such a diversion can be seen in FIGS. 4 and 7.

Note that the outer end of drain hose assembly 22 is threaded at 39. This is to provide a means by which the hose can be connected to another hose assembly in order to lengthen the assembly so it can reach a desired location if a single hose assembly is not long enough.

The hose assembly 22 is formed with apertures 40 and 42 along its length near the collar 28. These apertures can be opened or sealed by way of plugs 50. Each plug is threaded at 52 to receive a threaded retainer nut 54. Each plug has an expanded cone-shaped front 56 which is tapered. The inner end of front 56 forms a ledge 58. The interior peripheral surfaces about each aperture engages the ledges.

The plugs grasp, seal, and close the openings by threading the nuts 54 to threads 52. As the nuts are tightened they are moved toward ledge 58, securing the peripheral surface therebetween.

The apertures are important because they can be opened or closed as desired by the plugs 50. Some ordinances will not permit the use of a bleeder line and others will not permit the water exiting from a bleeder line to exhaust into the sewer vent. As seen in FIG. 6, the assembly 22 receives the lines 18 and 24 and leads them directly to the sewer vent. They could be led anywhere. As stated above, some localities insist that the bleeder line be directed toward a useful purpose such as to a lawn or flower bed. In those instances, one of the plugs 50 is removed and the bleeder line exits in such a manner as to comply with the law. The main factor in such instances is to provide a bleeder line 18 or an overflow line sufficiently long to at least reach the gutter of the roof. Such a diversion can be seen in FIGS. 4 and 6. Of course, in such an instance, the down spout leading from the gutter must lead to a useful area.

Note that the outer end of the drain hose assembly 22 is threaded at 39. This is merely to provide additional length by joining together a series of hose segments. Also note that sealing washers 60 and 62 are provided. These washers are compressed by their corresponding sealing nuts 64 and 66.

The present invention has been described as a device which is readily connected to commonplace currently-sold evaporative coolers. It will accommodate a bleeder line and an overflow line in a manner conducive to the environment and in compliance with all ordinances governing such installations known to the inventor at this time.

There has been disclosed a very inexpensive and uncomplicated device whereby homeowners and other building owners can protect their roofs. The assembly of this invention helps provide means to collect the two major water sources by which roofs are stained and/or damaged and provide an assembly structure which can be adapted for use under a variety of ordinances.

I claim:

1. A roof-supported evaporative cooler having a drain pipe extending through the bottom of a reservoir pan thereof comprising a bleeder line and an overflow line leading from said cooler through said drain pipe;

a relatively flat collector hose having a first end and a second end;

a collar at one end of said hose that is internally threaded for connection to said drain pipe and has a groove formed therein;

a grommet received in said groove having a diametric web extending thereacross;

said web having first and second openings formed therein;

said collector hose having apertures formed in the side thereof through which said bleeder line and said overflow line can exit; and said lines having a length sufficient to reach desired points of disposal.

2. The invention of claim 1 wherein first and second plug members are provided to plug said apertures.

3. The invention of claim 1 wherein said second end of said collector hose is threaded.

4. The invention of claim 1 wherein a clip is secured to said second end of said collector hose for securing said second end to a sewer vent pipe or to any desired location.

* * * * *